United States Patent
Matsuoka

(10) Patent No.: US 7,525,681 B2
(45) Date of Patent: Apr. 28, 2009

(54) PRINTING APPARATUS AND PRINT-MEDIUM DETECTION METHOD

(75) Inventor: Yasushi Matsuoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 10/900,190

(22) Filed: Jul. 28, 2004

(65) Prior Publication Data

US 2005/0024663 A1 Feb. 3, 2005

(30) Foreign Application Priority Data

Jul. 31, 2003 (JP) ............... 2003-204821

(51) Int. Cl.
*G06F 15/00* (2006.01)
*G06K 1/00* (2006.01)

(52) U.S. Cl. ............. 358/1.16; 358/1.12; 358/1.14; 358/1.15; 358/1.17

(58) Field of Classification Search ............... 358/1.15, 358/1.16, 1.17, 1.14, 1.12; 271/143; 399/23, 399/389, 85; 400/61; 101/484
See application file for complete search history.

(56) References Cited

U.S. PATENT DOCUMENTS

| | | | | |
|---|---|---|---|---|
| 5,835,820 A | * | 11/1998 | Martin et al. ............ | 399/85 |
| 6,497,179 B1 | * | 12/2002 | Allen et al. ............ | 101/484 |
| 6,646,758 B1 | * | 11/2003 | Anderson et al. ......... | 358/1.15 |
| 6,648,324 B2 | * | 11/2003 | Hoberock et al. .......... | 271/143 |
| 6,834,166 B2 | * | 12/2004 | Fujikura ................ | 399/23 |
| 6,850,337 B1 | * | 2/2005 | Anderson et al. ......... | 358/1.15 |
| 7,062,215 B2 | * | 6/2006 | Noda .................. | 399/389 |
| 7,099,034 B2 | * | 8/2006 | Anderson et al. ......... | 358/1.15 |
| 7,167,657 B2 | * | 1/2007 | Inoue et al. ............ | 399/44 |
| 7,396,100 B2 | * | 7/2008 | Hara .................. | 347/19 |
| 2004/0213611 A1 | * | 10/2004 | Weast ................. | 400/61 |

FOREIGN PATENT DOCUMENTS

| | | |
|---|---|---|
| JP | 10-198093 | 7/1998 |
| JP | 2003-136813 | 5/2003 |

* cited by examiner

*Primary Examiner*—Edward L Coles
*Assistant Examiner*—Satwant K Singh
(74) *Attorney, Agent, or Firm*—Fitzpatrick, Cella, Harper & Scinto

(57) ABSTRACT

A printing apparatus for printing on a print medium in accordance with information transmitted from a printer driver is provided with first and second automatic sheet feeders capable of feeding respective ones of print media of types that differ from each other, a memory for storing information relating to a type of print medium that has been detected, a media sensor for detecting the type of print medium that has been supplied by the first automatic sheet feeder, and a changeover switch for changing over to whichever of the first and second automatic sheet feeders is to be used in printing. If the fact that the changeover switch has been operated is detected, the information relating to the type of print medium is invalidated and information relating to the type of print medium is transmitted in response to a request from the printer driver.

10 Claims, 5 Drawing Sheets

PRINTING APPARATUS AND PRINT-MEDIUM DETECTION METHOD

FIELD OF THE INVENTION

This invention relates to a printing apparatus and to a method of detecting a print medium. More particularly, the invention relates to processing of information relating to types of print media in a printing apparatus having a plurality of print-medium feed means capable of being switched among by a user, only one of the feed means being equipped with means for detecting the type of print medium.

BACKGROUND OF THE INVENTION

Printers for printing desired information such as text and images on sheet-like print media such as paper and film are used widely as information output devices in word processors, personal computers and facsimile machines, by way of example.

The ever wider use of printers is accompanied by an increase in the types of print media (paper) employed in printing. For example, various print media such as plain paper, high-quality paper, labels, coated paper and photo paper are used in printing.

In the prior art, the setting of the print medium to be used in printing generally is performed by the user via a printer driver. In recent years, however, printers equipped with a media sensor for sensing the type of print media used have been proposed with a view to mitigating the load to which the user is subjected (for example, see the specification of Japanese Patent Application Laid-Open No. 10-198093).

Further, with a printer equipped with a media sensor, the type of print medium is detected at a prescribed timing when the medium is fed, print data is generated based upon the result of detection and printing is executed (for example, see the specification of Japanese Patent Application Laid-Open No. 2003-136813).

Assume that printing is performed by a printer having a plurality of paper feed means [an automatic sheet feeder (ASF), paper feed cassette or photo deck, etc.] capable of being switched by the user, and that a media sensor is provided for just one of these feed means. Depending upon the relationship between the timing at which the user switches the feed means and the timing at which media sensing is performed, media sensing may be carried out for detecting the type of print medium stacked in feed means that is not actually used in printing, and the result may be the generation of print data based upon erroneous information.

In such case print data that conforms to the print medium used will not be generated and the printing that is intended will not be executed. As a consequence, not only is the print medium and printing agent such as ink and toner wasted but it is also possible that soiling or malfunction of the apparatus will result.

SUMMARY OF THE INVENTION

An object of the present invention is to prevent printing from being performed based upon erroneous detection results irrespective of timing at which a user switches over feed means in a printing apparatus having a plurality of print-medium feed means capable of being switched by the user and a media sensor provided for just one of these feed means.

Another object of the present invention is to provide a print-medium detection method for preventing printing from being performed based upon erroneous detection results irrespective of timing at which a user switches over feed means in a printing apparatus having a plurality of print-medium feed means capable of being switched by the user and a media sensor provided for just one of these feed means.

According to the present invention, the first object is attained by providing a printing apparatus for printing on a print medium in accordance with information transmitted from a printer driver, comprising: first and second print-medium feed means capable of feeding respective ones of print media of types that differ from each other; print-medium detecting means for detecting the type of print medium fed by the first print-medium feed means; storage means for storing information relating to the type of print medium that has been detected by the print-medium detecting means; information transmitting means responsive to a request from the printer driver for transmitting the information relating to the type of print medium that has been detected by the print-medium detecting means; changeover means for changing over to whichever of the first and second print-medium feed means is to be used in printing; changeover detecting means for detecting the fact that the changeover means has been operated; and detection information invalidating means for invalidating the information relating to the type of recording medium that has been stored in the storage means if the fact that the changeover means has been operated is detected by the changeover detecting means.

More specifically, in accordance with an embodiment of the present invention, printing is performed on a print medium in accordance with information transmitted from a printer driver, and there are provided first and second print-medium feed means capable of feeding respective ones of print media of types that differ from each other, storage means for storing information relating to type of print medium that has been detected by print-medium detecting means, print-medium detecting means for detecting the type of print medium fed by the first print-medium feed means, and changeover means for changing over to whichever of the first and second print-medium feed means is to be used in printing. If the changeover means is operated and the fact that the changeover means has been operated is detected, then the information relating to the type of print medium is invalidated and information relating to the type of print medium is transmitted to the printer driver.

Thus, if the changeover means has been operated by the user, for example, after the type of print medium has been detected, the information relating to the type of print medium is invalidated. Even if information relating to the type of print medium has been transmitted in response to a request from the printer driver, the fact that the information relating to the print medium is invalid is recognized on the side of the printer driver.

Accordingly, in a case where the result of detecting the type of print medium cannot be assured, execution of printing based upon erroneous result of detection can be prevented.

The information relating to the type of print medium may include status data of this information and data indicating the type of print medium, and the detection information invalidating means manipulates a prescribed bit of the status data to thereby invalidate the information relating to the type of print medium.

The detection information invalidating means may rewrite the information relating to the type of print medium by prescribed information to thereby invalidate the information relating to the type of print medium.

The detection information invalidating means may invalidate the information relating to the type of print medium if a predetermined period of time elapses from detection of the information relating to the type of print medium by the print-medium detecting means.

The information transmitting means may transmit information relating to the state of the changeover means in response to a request from the printer driver.

The first print-medium feed means may be an automatic feeder capable of selectively feeding any print media of a plurality of types, and the second print-medium feed means may be feed means exclusively for a prescribed print medium.

Preferably, when print-medium feed means to be used in printing has been changed over to the second print-medium feed means by the changeover means, detection of the type of print medium by the print-medium detecting means is not performed even if there is a request from the printer driver.

According to the present invention, the second object is attained by providing a method of detecting a print medium in a printing apparatus for printing on a print medium in accordance with information transmitted from a printer driver and having first and second print-medium feed means capable of feeding respective ones of print media of types that differ from each other, print-medium detecting means for detecting the type of print medium fed by the first print-medium feed means, storage means for storing information relating to type of print medium that has been detected by the print-medium detecting means, and changeover means for changing over to whichever of the first and second print-medium feed means is to be used in printing, the method comprising: a changeover detecting step of detecting the fact that the changeover means has been operated; a detection information invalidating step of invalidating the information relating to the type of recording medium if the fact that the changeover means has been operated is detected at the changeover detecting step; and an information transmitting step of transmitting the information relating to the type of print medium in response to a request from the printer driver.

Further, the foregoing and other objects are attained by a computer program for causing the print-medium detection method to be executed by a computer apparatus, and by a storage medium that stores this computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Figure 1:
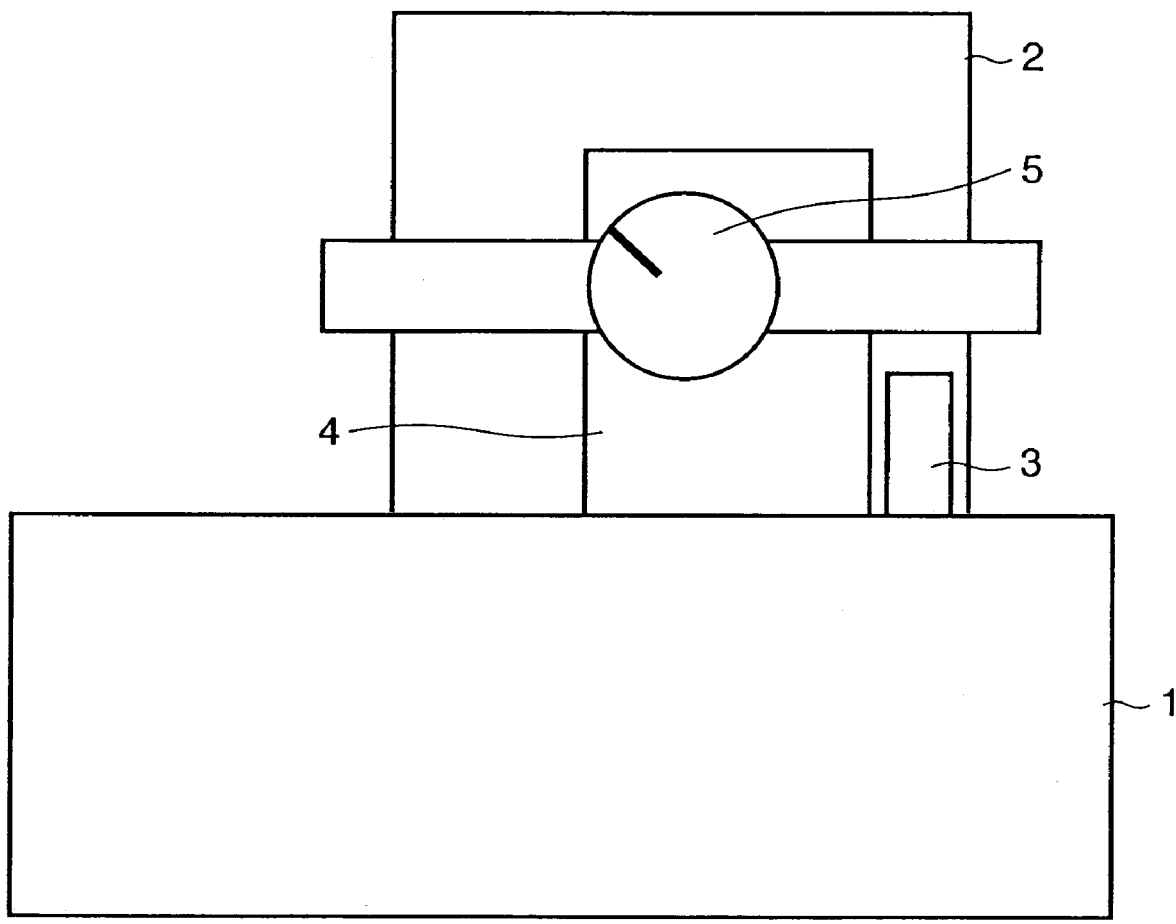
FIG. 1 is a diagram illustrating the structure of a printer according to the present invention.

FIG. 1 is a diagram illustrating the structure of a printer serving as an embodiment of a printing apparatus according to the present invention.

In FIG. 1, reference numeral 1 denotes the main body of a printer according to this embodiment. As will be described later, the printer prints an image on a print medium by an ink-jet method for driving a printhead provided with an array of nozzles for discharging ink. The printer is provided with an ASF (Automatic Sheet Feeder) 2 mounted on the main body 1 of the printer. A media sensor 3 is provided on the ASF 2.

The ASF 2 includes a print-medium stacking unit for stacking print media. The type of print medium that has been stacked in the print-medium stacking unit of the ASF 2 is detected by the media sensor 3 provided on the ASF 2. It should be noted that although the media sensor 3 is provided on the ASF 2, the media sensor 3 may be placed not on the ASF 2 but at a position where it is possible to detect the type of print medium that has been stacked in the print-medium stacking unit of the ASF 2. The media sensor 3 detects the type of print medium in response to a trigger (request) from a printer driver that has been installed in a host device connected to the printer. The printer notifies the printer driver of the host device of the result of detection by the media sensor 3, whereby the printer driver generates print data based upon the result of detection.

Thus, by detecting the type of print medium using the media sensor 3, print data suited to the print medium can be generated and this data can be printed. A feeding device (photo deck) different from the ASF 2 also is provided and is for stacking and feeding a print medium of a specific type. In this embodiment, the photo deck 4 is provided to feed a print medium that is for printing a photographic image and is particularly used for stacking print medium to be used when printing an L-format photograph. According to this embodiment, the photo deck 4 is a feed tray exclusively for a print medium (photo paper, etc.) for printing an L-format photographic image and therefore the photo deck 4 is not equipped with a media sensor.

A switch 5 switches the feed means between the ASF 2 and the photo deck 4. The switch 5 is a mechanical switch. Whether feed is from the ASF 2 or photo deck 4 is selected and set by operating the switch 5. If the switch 5 has been switched to the side of the photo deck 4, printing will be performed using the print medium that has been stacked in the photo deck 4. Accordingly, the media sensor 3 is situated not at the normal position but at a position above and spaced away from the print medium in the ASF 2. In this state, therefore, the media sensor 3 cannot detect correctly the type of print medium that has been placed in the ASF 2.

Thus, the printer 1 according to this embodiment is furnished with two feed means, namely the ASF 2 and the photo deck 4, and the ASF 2 is provided with the media sensor 3 for detecting the type of print medium.

Further, the feed means that feeds the print medium to the main body of the printer is set by the user through operation of the changeover switch 5. If feed of the print medium from the photo deck 4 has been set by the changeover switch 5, then the media sensor 3 cannot detect the print medium correctly.

A control arrangement for implementing printing control of the printer will now be described.

Figure 5:
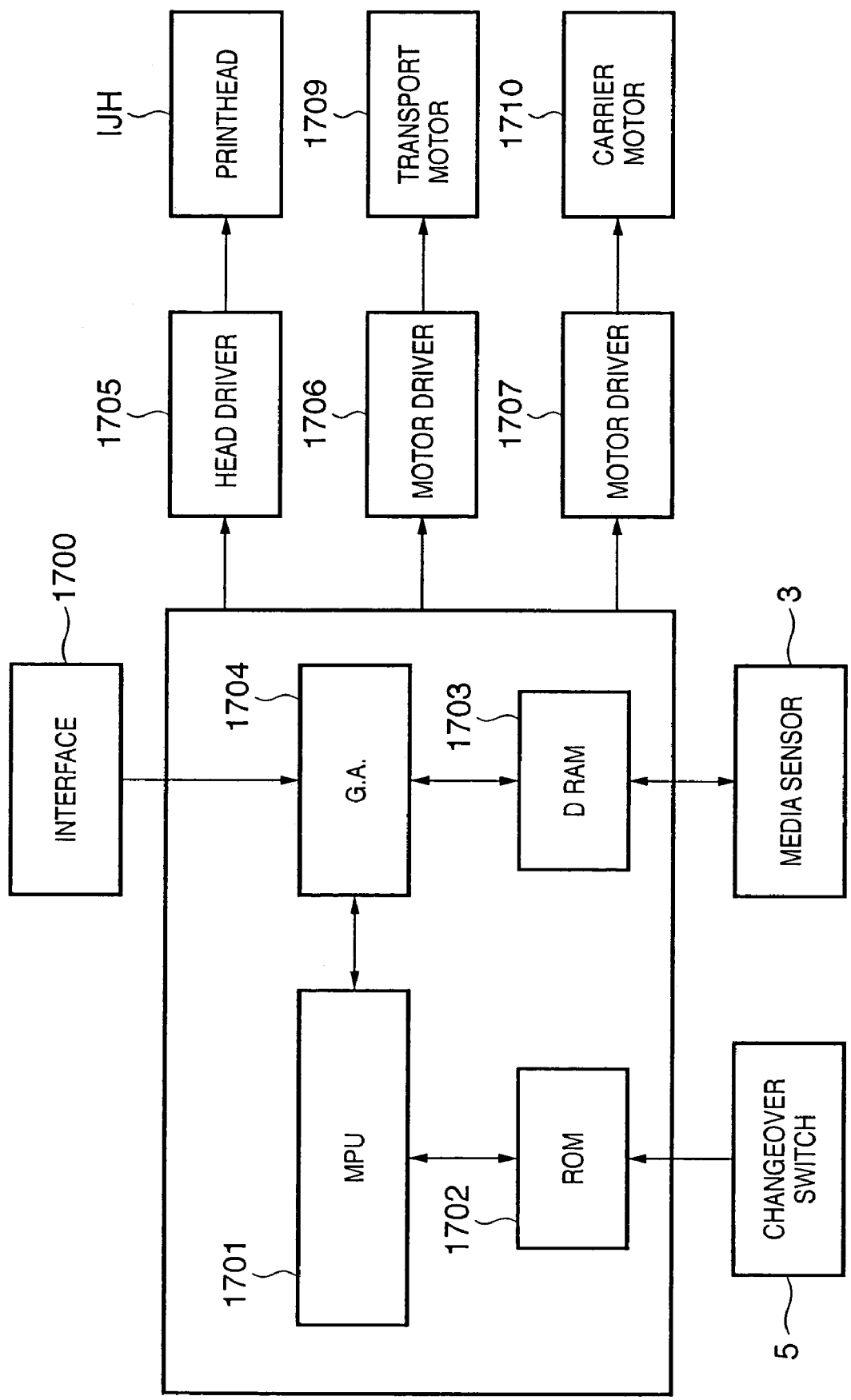
FIG. 5 is a block diagram illustrating control of the printer shown in FIG. 1.

FIG. 5 is a block diagram illustrating the structure of a control circuit for controlling the printer of this embodiment. In this diagram illustrating the control circuit, reference numeral 1700 denotes an interface, 1701 an MPU, 1702 a program ROM for storing a control program executed by the MPU 1701, and 1703 a DRAM below for storing various data (such as the above-mentioned print signal as well as print data supplied to the head) in advance. Reference numeral 1704 denotes a gate array for controlling supply of print data to a printhead IJH and for controlling transfer of data between the interface 1700, MPU 1701 and RAM 1703. Reference 1710 denotes a carrier motor for transporting the printhead IJH, and 1709 a transport motor 1709 for transporting printing paper. Reference numeral 1705 denotes a head driver for driving the printhead. Reference numerals 1706, 1707 denote motor drivers for driving the transport motor 1709 and carrier motor 1710, respectively.

Reference numeral 3 denotes the media sensor shown in FIG. 1. Upon receiving a signal, which is transmitted via the interface 1700 from the host device connected to the printer, requesting detection of the type of print medium, the media sensor 3 detects the type of print medium that has been set in the ASF and sends the result of detection back to the host device via the interface 1700. Furthermore, the changeover switch 5 outputs a signal indicating whether the ASF or the photo deck has been set as the feed means.

Operation of the above-described control arrangement will now be described. When a print signal enters the interface 1700, the print data is converted to printhead-drive data between the gate array 1704 and MPU 1701. The motor drivers 1706, 1707 are driven and the printhead is driven in accordance with the drive data sent to the head driver 1705, whereby printing is performed.

Here it is assumed that the control program executed by the MPU 1701 is stored in ROM 1702. However, it is also possible to adopt an arrangement in which an erasable/writable storage medium such as an EEPROM is added on and the control program can be modified from the host device connected to the printer.

Figure 2:
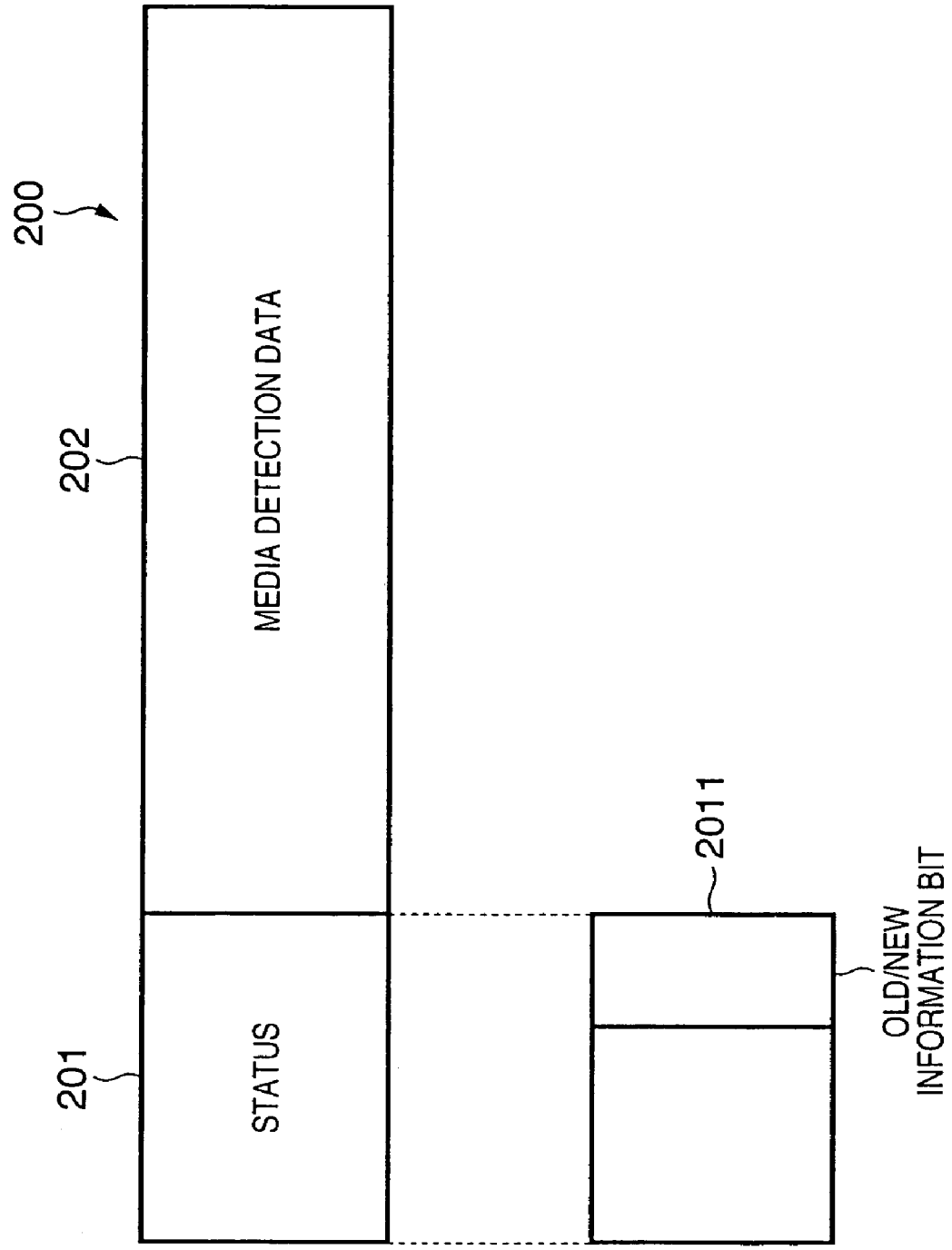
FIG. 2 is a diagram illustrating the data structure of media information according to the present invention.

FIG. 2 is a diagram illustrating the format of media information 200 used in this embodiment. The media information 200 contains information relating to the type of print medium and is composed of status data 201 and media detection data 202. The status data 201 includes information indicating the status of the information relating to the print medium, namely an information bit 2011 indicating whether the media detection data 202 is valid (new) or invalid (old). Ideally, the status data will include information indicating the date and time at which the media detection data 202 was created.

The media detection data 202 includes the result of detection of the print medium, namely information indicating the print medium. The detection has been executed by the media sensor 3 in response to a trigger that is a device-ID request signal, which is one type of print signal transmitted from the printer driver installed in the host device.

The media information 200 is stored in a memory area (RAM) on the printer side accessible by the printer driver. However, the media information 200 may be stored in a memory area (RAM) of the host device if the memory area is accessible by the printer driver.

If the information bit 2011 indicates "old", this means that the information represented by the media detection data 202 is invalid and therefore it is necessary for the media sensor to perform an operation to detect the print medium. If such detection is executed by the media sensor, the information bit 2011 will then indicate "new". The detection operation will not be performed subsequently for a predetermined period of time.

However, in a case where a changeover switch operated by the user has been provided, as in this embodiment, the reliability of the information that has been stored as the media detection data 202 cannot be assured when the feed means has been switched from the ASF to the photo deck or from the photo deck to the ASF by user operation.

In order to prevent the media detection data 202 from being used under these conditions, this embodiment is such that when the changeover switch has been changed over by user operation, the information bit 2011 is rewritten to "old", thereby invalidating the media detection data 202.

Figure 3:
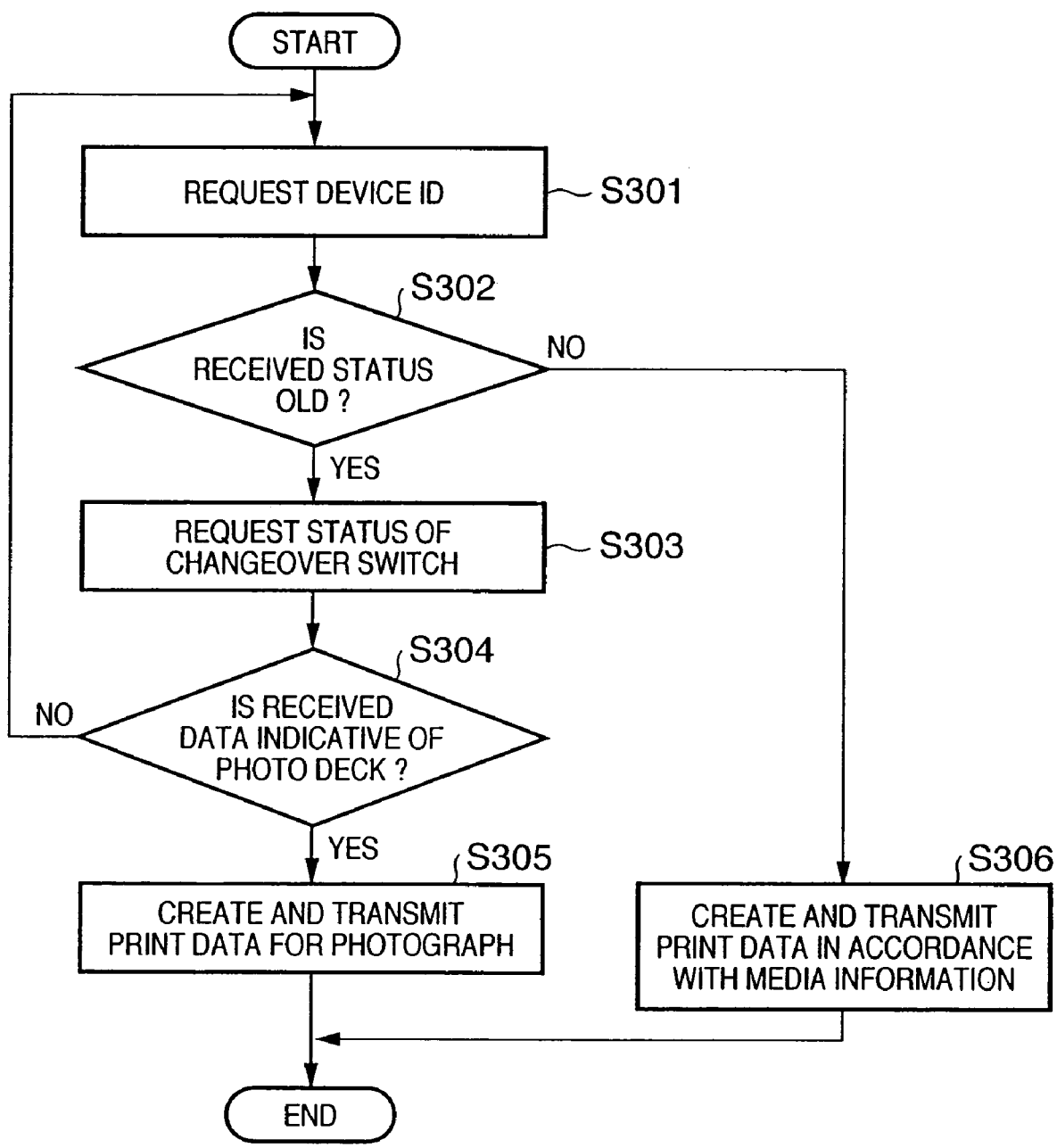
FIG. 3 is a flowchart illustrating the operation of the printer driver according to an embodiment of the present invention.
Figure 4:
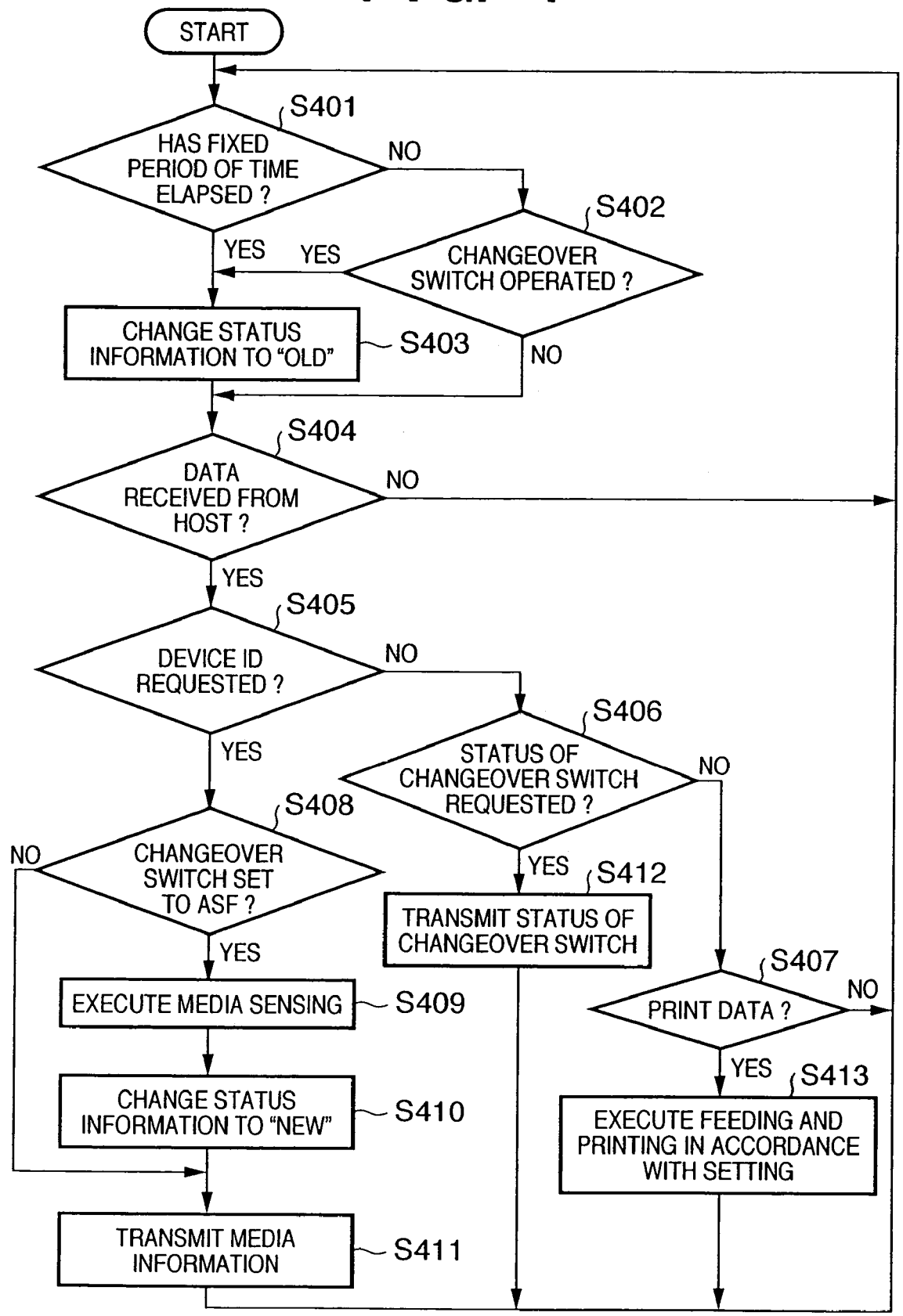
FIG. 4 is a flowchart illustrating the operation of a printer according to an embodiment of the present invention.

Operation according to this embodiment will now be described with reference to the flowcharts of FIGS. 3 and 4. FIG. 3 is a flowchart illustrating operation on the side of the printer driver (the host device), and FIG. 4 is a flowchart illustrating operation on the side of the printer.

When printing is commanded by an application running on the host device, the printer driver is started up. The printer driver sends the printer a signal requesting the device ID, which is information indicative of the print medium set initially in the printer (step S301).

Upon receiving media information of the kind exemplified in FIG. 2 from the printer, the printer driver determines whether the information bit 2011 in the status data 201 is "old" (step S302).

If it is determined at step S302 that the status is "old", then the printer driver requests the printer to transmit changeover-switch status information in order to check whether the setting of the changeover switch 5 of the printer is the side of the photo deck or the side of the ASF (step S303).

Upon receiving the changeover-switch status information from the printer, the printer driver determines whether the switch has been set to the side of the photo deck (step S304). If the changeover switch has been set to the side of the photo deck, image processing, etc., for a photographic image is executed, then the printer driver creates print data for printing an L-format photographic image and transmits the data to the printer (step S305). If the switch has not been set to the side of the photo deck, on the other hand, then control returns to step S301 in order that the printer driver may request the device ID again.

If it is determined at step S302 that the status is not "old", i.e., that the status is "new", then the printer driver executes image processing in accordance with the media information (media detection data 202) that has been transmitted from the printer, thereby creating print data, and transmits the print data to the printer (step S306).

It may be so arranged that if a step of verifying whether data transmitted from the printer has been received is inserted between steps S301 and S302 and between steps S303 and S304 and receipt of data is not verified within a predetermined period of time, then the printer driver executes error processing and displays a message calling for verification of printer status and connection status.

Operation performed on the side of the printer will now be described with reference to the flowchart of FIG. 4.

With the printer in the standby state following introduction of power, the printer determines whether elapsed time from acquisition of media information has exceeded a predetermined period of time (step S401). If the predetermined period of time has not elapsed, then the printer determines whether the changeover switch has been operated by the user (step S402).

This determination may be made by previously storing information indicative of the state of changeover switch 5 is a prescribed area of a memory such as a RAM and comparing this information with the present state of the changeover switch 5, or based upon a match between the present state of the changeover switch 5 and the content of the media detection data 202.

If the printer determines that the predetermined period of time has elapsed, on the other hand, the information bit 2011 of the status information is changed to data representing "old" (step S403).

After it is determined at step S402 that the changeover switch 5 has not been operated, and after the status information is changed at step S403, the printer determines whether data transmitted from the host device (printer driver) has been received (step S404).

If there is data that has been received from the host device, then the printer determines whether the received data is a device ID (step S405), a request for status of the changeover switch 5 (step S406) or print data (step S407), executes processing corresponding to the received data, as will be described later, and returns control to step S401.

If the printer determines that the data received at step S405 is a device ID request, then the printer determines whether the changeover switch 5 has been set to the ASF (step S408). If the changeover switch 5 has been set to the ASF, then the printer executes media sensing to acquire information (the media detection data 202) concerning the print medium (step S409), updates the print-medium information (media detection data 202) and changes the information bit 2011 of the status information to "new" (step S410). In a case where the printer determines at step S408 that the changeover switch 5 is not on the ASF side, namely that the switch has been set to the photo deck, and after the status information is updated at step S410, the printer transmits the media information 200 to the printer driver (step S411).

If the printer determines at step S406 that the received data is a request for the status of the changeover switch 5, then the printer reads the status of the changeover switch 5 and transmits the status to the printer driver as changeover-switch status information (step S412).

If the printer determines at step S407 that the received data is print data, then the printer feeds the print medium from the feed means set by the changeover switch and executes a printing operation in accordance with the print data (step S413).

This embodiment is such that if feed means is changed over by the user of a printer having an ASF and a photo deck as the feed means and only the ASF is provided with a media sensor, then information relating to the print medium detected by the media sensor is invalidated and detection of the type of print medium is executed again as necessary. As a result, regardless of the timing at which the user switches over feed means, it is possible to prevent printing from being performed based upon erroneous detection results.

<First Modification>

In the above embodiment, the information bit 2011 indicating whether the information (media detection data 202) concerning the print medium detected by the media sensor is valid is provided within the status data 201 representing the status of the media information, and the information concerning the detected print medium is invalid and not used if the information bit 2011 indicates "old". However, it is also permissible to adopt an arrangement in which, rather than providing the information bit 2011, the data of the media detection data 202 is overwritten by prescribed data (0xFF, etc.) signifying invalidity, in such a manner that the information concerning the detected print medium itself will be invalidated if the changeover switch 5 is operated or a prescribed period of time elapses from detection of the print medium by the media sensor 3.

In this case, it may be so arranged that instead of referring to the status information and determining whether it is "old", reference is had to the content of the media detection data 202 and it is determined whether this data is data signifying invalidity.

Further, it may be so arranged that even in a case where the information bit 2011 is provided, the content of the media detection data 202 is rewritten by data signifying invalidity when the information bit 2011 is changed to "old".

<Second Modification>

In the above embodiment, changeover-switch status information indicating the status of the changeover switch 5 is transmitted from the printer to the printer driver in response to a request from the printer driver. However, it is also permissible to adopt an arrangement in which if there are two feed means, namely a photo deck and an ASF, it is determined that the changeover switch 5 has been set to the side of the photo deck even though information relating to the status of the changeover switch 5 is no longer obtained. For example, if, in a case where the status of the media information that has been transmitted from the printer is "old", the printer driver transmits the request for the device ID again and the status of the media information transmitted from the printer in response to this request is "old" again, then it can be determined that the changeover switch 5 has been set to the side of the photo deck.

<Third Modification>

In the above embodiment, a mechanical switch is adopted as the switch 5 that changes over the feed means between the ASF 2 and the photo deck 4. However, it is permissible to adopt an arrangement in which the user can select the feed means by employing the printer driver of the host device and the feed means selected using the printer driver is reported to the printer 1.

In this case, the following arrangement is adopted instead of the foregoing embodiment in which the media sensor 3 is made to depart from the print medium when the feed means is made the photo deck 4 by the switch 5: Before the operation for determining the type of print medium is performed by the media sensor 3, it is determined which feed means has been selected. If the photo deck 4 has been selected as the feed means, then the operation for determining the type of print medium is not carried out.

<Fourth Modification>

In the above embodiment, the information concerning the print medium is contained in the media detection data 202. However, it does not matter whether this information concerning the print medium is information relating to the type of print medium or output data obtained from the media sensor 3. If the information concerning the print medium is output data obtained from the media sensor 3, it will suffice to detect the type of print medium based upon the output data from the media sensor 3. This makes it possible to lighten the load on the printer 1.

In the embodiment and modifications described above, the media sensing operating for detecting the type of print medium is performed in response to a request from a printer driver, however, the media sensing operation may be performed for every predetermined period. Further, if the detection that print medium has been newly stacked in the feed means is possible, the media sensing operation may be performed when the print medium has been newly stacked.

<Other Embodiments>

In the above embodiment, an example in which the present invention is applied to a serial printer employing the ink-jet method is described. However, the present invention is also applicable to printers that employ printing methods other than the ink-jet method.

In addition, the printing apparatus of the present invention has a form in which it is provided as an integral part of, or separate from, an image output terminal of an information processing apparatus such as a computer. However, the printing apparatus may take the form of a copier combined with a reader or the like, or the form of a facsimile machine having a transceive function.

The present invention can be applied to a system comprising a plurality of devices (e.g., host computer, interface, reader, printer) or to an apparatus comprising a single device (e.g., copying machine, facsimile machine).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to the above mentioned flowcharts (FIG. 3 and/or FIG. 4) are to be stored in the storage medium.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No.2003-204821, filed on Jul. 31, 2003, which is hereby incorporated by reference herein.

What is claimed is:

1. A printing apparatus for printing on a print medium in accordance with information transmitted from a printer driver, comprising:
   first and second print-medium feed means capable of feeding respective ones of print media of types that differ from each other;
   print-medium detecting means for detecting the type of print medium fed by said first print-medium feed means;
   storage means for storing information relating to the type of print medium that has been detected by said print-medium detecting means;
   information transmitting means responsive to a request from the printer driver for transmitting the information relating to the type of print medium that has been detected by said print-medium detecting means;
   changeover means for changing over to whichever of said first and second print-medium feed means is to be used in printing;
   changeover detecting means for detecting the fact that said changeover means has been operated; and
   detection information invalidating means for invalidating the information relating to the type of recording medium that has been stored in said storage means if the fact that said changeover means has been operated is detected by said changeover detecting means.

2. The apparatus according to claim 1, wherein the information relating to the type of print medium includes status data of this information and data indicating the type of print medium, and said detection information invalidating means manipulates a prescribed bit of the status data to thereby invalidate the information relating to the type of print medium.

3. The apparatus according to claim 1, wherein said detection information invalidating means rewrites the information relating to the type of print medium by prescribed information to thereby invalidate the information relating to the type of print medium.

4. The apparatus according to claim 1, wherein said detection information invalidating means invalidates the information relating to the type of print medium if a predetermined period of time elapses from detection of the information relating to the type of print medium by said print-medium detecting means.

5. The apparatus according to claim 1, wherein said information transmitting means transmits information relating to the state of said changeover means in response to a request from the printer driver.

6. The apparatus according to claim 1, wherein said first print-medium feed means is an automatic feeder capable of selectively feeding any print media of a plurality of types, and said second print-medium feed means is feed means exclusively for a prescribed print medium.

7. The apparatus according to claim 1, wherein when print-medium feed means to be used in printing has been changed over to said second print-medium feed means by said changeover means, detection of the type of print medium by said print-medium detecting means is not performed even if there is a request from the printer driver.

8. A method of detecting a print medium in a printing apparatus for printing on a print medium in accordance with information transmitted from a printer driver and having first and second print-medium feed means capable of feeding respective ones of print media of types that differ from each other, print-medium detecting means for detecting the type of print medium fed by said first print-medium feed means, storage means for storing information relating to type of print medium that has been detected by said print-medium detecting means, and changeover means for changing over to whichever of said first and second print-medium feed means is to be used in printing, said method comprising:

a changeover detecting step of detecting the fact that said changeover means has been operated;

a detection information invalidating step of invalidating the information relating to the type of recording medium if the fact that said changeover means has been operated is detected at said changeover detecting step; and an information transmitting step of transmitting the information relating to the type of print medium in response to a request from the printer driver.

9. A computer program for causing a computer to execute a method of detecting a print medium in a printing apparatus for printing on a print medium in accordance with information transmitted from a printer driver and having first and second print-medium feed means capable of feeding respective ones of print media of types that differ from each other, print-medium detecting means for detecting the type of print medium fed by said first print-medium feed means, storage means for storing information relating to type of print medium that has been detected by said print-medium detecting means, and changeover means for changing over to whichever of said first and second print-medium feed means is to be used in printing, said computer program having program code for causing the computer to execute the following steps:

a changeover detecting step of detecting the fact that said changeover means has been operated;

a detection information invalidating step of invalidating the information relating to the type of recording medium if the fact that said changeover means has been operated is detected at said changeover detecting step; and an information transmitting step of transmitting the information relating to the type of print medium in response to a request from the printer driver.

10. A storage medium storing a computer program for causing a computer to execute a method of detecting a print medium in a printing apparatus for printing on a print medium in accordance with information transmitted from a printer driver and having first and second print-medium feed means capable of feeding respective ones of print media of types that differ from each other, print-medium detecting means for detecting the type of print medium fed by said first print-medium feed means, storage means for storing information relating to type of print medium that has been detected by said print-medium detecting means, and changeover means for changing over to whichever of said first and second print-medium feed means is to be used in printing, said computer program having program code for causing the computer to execute the following steps:

a changeover detecting step of detecting the fact that said changeover means has been operated;

a detection information invalidating step of invalidating the information relating to the type of recording medium if the fact that said changeover means has been operated is detected at said changeover detecting step; and an information transmitting step of transmitting the information relating to the type of print medium in response to a request from the printer driver.

* * * * *